(12) United States Patent
Balmaceda et al.

(10) Patent No.: US 11,315,429 B1
(45) Date of Patent: Apr. 26, 2022

(54) SYSTEM AND METHOD FOR PROVIDING AN ALERT TO A DRIVER OF A HOST VEHICLE

(71) Applicant: Lear Corporation, Southfield, MI (US)

(72) Inventors: Christian Balmaceda, Southfield, MI (US); Jagat Ghimire, Southfield, MI (US); Hongen Tu, Southfield, MI (US); David R. Mulligan, Livonia, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/081,079

(22) Filed: Oct. 27, 2020

(51) Int. Cl.
| | |
|---|---|
| *G08G 1/16* | (2006.01) |
| *G08G 1/056* | (2006.01) |
| *B60Q 9/00* | (2006.01) |
| *H04W 4/46* | (2018.01) |

(52) U.S. Cl.
CPC ............ *G08G 1/162* (2013.01); *B60Q 9/008* (2013.01); *G08G 1/056* (2013.01); *G08G 1/166* (2013.01); *H04W 4/46* (2018.02)

(58) Field of Classification Search
CPC ........ G08G 1/162; G08G 1/166; G08G 1/056; H04W 4/46; B60Q 9/008
See application file for complete search history.

(56) References Cited

U.S. PATENT DOCUMENTS

| | | |
|---|---|---|
| 3,500,119 A | 3/1970 | Price |
| 4,236,099 A | 11/1980 | Rosenblum |
| 4,967,319 A | 10/1990 | Seko |
| 5,451,820 A | 9/1995 | Gotoh et al. |
| 5,942,853 A | 8/1999 | Piscart |
| 6,010,277 A | 1/2000 | Follman |
| 6,097,023 A | 8/2000 | Schofield et al. |
| 6,587,573 B1 | 7/2003 | Stam et al. |
| 6,877,929 B1 | 4/2005 | Yang |

(Continued)

FOREIGN PATENT DOCUMENTS

| | | |
|---|---|---|
| CA | 2568055 A1 | 3/2000 |
| CN | 104709271 A | 6/2015 |

(Continued)

OTHER PUBLICATIONS

R. Miucic, A. Sheikh, Z. Medenica and R. Kunde, "V2X Applications Using Collaborative Perception," 2018 IEEE 88th Vehicular Technology Conference (VTC-Fall), Chicago, IL, USA, 2018, 6 pages.

(Continued)

*Primary Examiner* — Ryan W Sherwin
(74) *Attorney, Agent, or Firm* — Brooks Kushman P.C.

(57) ABSTRACT

A system and method are described for providing an alert to a driver of a host vehicle. The system includes a communication unit to be mounted in the host vehicle and configured to receive a vehicle-to-x communication including data indicative of a characteristic of a second vehicle. The system also includes a controller to be mounted in the host vehicle and provided in communication with the communication unit. The controller is configured to provide an alert to the driver of the host vehicle based on data indicative of a characteristic of the host vehicle, the data indicative of a characteristic of the second vehicle, and map data for a geographic area associated with the host vehicle and the second vehicle.

20 Claims, 4 Drawing Sheets

(56) References Cited

U.S. PATENT DOCUMENTS

| | | | |
|---|---|---|---|
| 7,507,052 B2 | 3/2009 | Griffiths | |
| 7,565,006 B2 | 7/2009 | Stam et al. | |
| 7,566,851 B2 | 7/2009 | Stein et al. | |
| 7,609,150 B2 | 10/2009 | Wheatley et al. | |
| 7,645,090 B2 | 1/2010 | Rastegar et al. | |
| 8,116,523 B2 * | 2/2012 | Amagasaki | G06V 20/58 |
| | | | 382/104 |
| 8,186,905 B2 | 5/2012 | Castro et al. | |
| 8,688,376 B2 | 4/2014 | Stahlin et al. | |
| 8,946,990 B1 | 2/2015 | Gupta | |
| 8,970,358 B2 | 3/2015 | Kiefer et al. | |
| 9,035,797 B2 | 5/2015 | Varma | |
| 9,204,276 B2 | 12/2015 | Hellwig et al. | |
| 9,333,971 B1 | 5/2016 | Han | |
| 9,443,426 B1 | 9/2016 | Formwalt | |
| 9,555,736 B2 | 1/2017 | Solar et al. | |
| 9,558,659 B1 | 1/2017 | Silver et al. | |
| 9,689,121 B2 | 6/2017 | Shi et al. | |
| 9,713,956 B2 | 7/2017 | Bark et al. | |
| 9,729,636 B2 | 8/2017 | Koravadi et al. | |
| 9,731,645 B1 | 8/2017 | Taleb-Bendiab | |
| 9,809,167 B1 | 11/2017 | Badger, II | |
| 9,824,581 B2 | 11/2017 | Bhat et al. | |
| 9,896,106 B1 | 2/2018 | Wrobel et al. | |
| 9,937,860 B1 | 4/2018 | Moradi-Pari et al. | |
| 9,951,487 B1 | 4/2018 | Gonzalez De Cosio Leal | |
| 10,139,244 B2 * | 11/2018 | Schilling | G08G 1/167 |
| 10,349,011 B2 | 7/2019 | Du et al. | |
| 10,484,848 B2 | 11/2019 | Cavalcanti et al. | |
| 10,565,874 B1 | 2/2020 | Lei et al. | |
| 10,575,151 B2 | 2/2020 | Tawadrous et al. | |
| 10,577,762 B2 | 3/2020 | Abu Al-Rubb | |
| 10,745,870 B2 | 8/2020 | Xiang et al. | |
| 2002/0080618 A1 | 6/2002 | Kobayashi et al. | |
| 2003/0016143 A1 | 1/2003 | Ghazarian | |
| 2003/0107323 A1 | 6/2003 | Stam | |
| 2003/0195704 A1 * | 10/2003 | Sekiguchi | B60W 30/16 |
| | | | 701/301 |
| 2005/0063779 A1 | 3/2005 | Yang | |
| 2006/0014611 A1 | 1/2006 | Kitamura et al. | |
| 2007/0276600 A1 | 11/2007 | King et al. | |
| 2008/0266396 A1 | 10/2008 | Stein | |
| 2009/0299549 A1 | 12/2009 | Albertson | |
| 2011/0298603 A1 | 12/2011 | King et al. | |
| 2012/0029730 A1 | 2/2012 | Nagura et al. | |
| 2012/0280806 A1 | 11/2012 | Yu et al. | |
| 2012/0282024 A1 | 11/2012 | Hua | |
| 2013/0188258 A1 | 7/2013 | Mathieu et al. | |
| 2013/0209169 A1 | 8/2013 | Chew et al. | |
| 2014/0222280 A1 | 8/2014 | Salomonsson et al. | |
| 2015/0003087 A1 | 1/2015 | Futamura et al. | |
| 2015/0042226 A1 | 2/2015 | Hibino | |
| 2015/0050906 A1 | 2/2015 | Yuasa | |
| 2015/0130643 A1 * | 5/2015 | Nagy | G08G 1/166 |
| | | | 340/935 |
| 2015/0167614 A1 | 6/2015 | Malone et al. | |
| 2015/0216021 A1 | 7/2015 | Bennett et al. | |
| 2015/0360601 A1 | 12/2015 | Chambers et al. | |
| 2015/0381751 A1 | 12/2015 | Haran | |
| 2016/0036917 A1 | 2/2016 | Koravadi et al. | |
| 2016/0185347 A1 | 6/2016 | Lefevre et al. | |
| 2016/0232414 A1 | 8/2016 | Salomonsson et al. | |
| 2016/0236611 A1 | 8/2016 | Langkabel et al. | |
| 2016/0266242 A1 | 9/2016 | Gilliland et al. | |
| 2016/0288699 A1 | 10/2016 | Solar et al. | |
| 2016/0318490 A1 | 11/2016 | Ben Shalom | |
| 2016/0343254 A1 | 11/2016 | Rovik et al. | |
| 2016/0363647 A1 | 12/2016 | Zeng et al. | |
| 2017/0018178 A1 * | 1/2017 | Poechmueller | G08G 1/09626 |
| 2017/0025012 A1 * | 1/2017 | Thompson | G08G 1/166 |
| 2017/0066374 A1 | 3/2017 | Hoye | |
| 2017/0113550 A1 | 4/2017 | Li et al. | |
| 2017/0113665 A1 | 4/2017 | Mudalige et al. | |
| 2017/0132935 A1 | 5/2017 | Xu et al. | |
| 2017/0206426 A1 | 7/2017 | Schrier et al. | |
| 2017/0214747 A1 | 7/2017 | Schulte et al. | |
| 2017/0217421 A1 | 8/2017 | Theodosis et al. | |
| 2017/0350360 A1 | 12/2017 | Tedesco et al. | |
| 2017/0369055 A1 * | 12/2017 | Saigusa | G08G 1/0116 |
| 2018/0129215 A1 | 5/2018 | Hazelton et al. | |
| 2018/0174449 A1 | 6/2018 | Nguyen | |
| 2018/0222391 A1 | 8/2018 | Chen | |
| 2018/0253613 A1 | 9/2018 | Fung et al. | |
| 2018/0253968 A1 | 9/2018 | Yalla | |
| 2018/0281771 A1 | 10/2018 | Ito et al. | |
| 2018/0297470 A1 | 10/2018 | Kim | |
| 2018/0312164 A1 | 11/2018 | Sasabuchi | |
| 2019/0018419 A1 | 1/2019 | Lee et al. | |
| 2019/0031207 A1 * | 1/2019 | Nakamura | B60W 50/14 |
| 2019/0066490 A1 | 2/2019 | Skvarce | |
| 2019/0364402 A1 | 11/2019 | Lee | |
| 2019/0367048 A1 | 12/2019 | Yoshida et al. | |
| 2019/0384870 A1 | 12/2019 | Shiraishi et al. | |
| 2019/0394625 A1 | 12/2019 | Kim et al. | |
| 2020/0013283 A1 | 1/2020 | Sato et al. | |
| 2020/0026284 A1 | 1/2020 | Hiramatsu et al. | |
| 2020/0062074 A1 | 2/2020 | Macneille et al. | |
| 2020/0066159 A1 | 2/2020 | Chase | |
| 2020/0079363 A1 | 3/2020 | Frederick et al. | |
| 2020/0079386 A1 | 3/2020 | Kim | |
| 2020/0092694 A1 | 3/2020 | Chen et al. | |
| 2020/0096359 A1 | 3/2020 | Sakr et al. | |
| 2020/0100167 A1 | 3/2020 | Cheng et al. | |
| 2020/0180612 A1 | 6/2020 | Finelt et al. | |
| 2020/0192355 A1 | 6/2020 | Lu | |
| 2020/0211372 A1 | 7/2020 | Nabrotsky | |
| 2020/0236521 A1 | 7/2020 | Vassilovski et al. | |
| 2020/0263372 A1 | 8/2020 | Nastev | |
| 2020/0380868 A1 | 12/2020 | Bhunia et al. | |
| 2021/0009027 A1 | 1/2021 | Mulligan | |
| 2021/0027629 A1 | 1/2021 | Tao et al. | |
| 2021/0197865 A1 * | 7/2021 | Zhou | B60W 30/18036 |

FOREIGN PATENT DOCUMENTS

| | | |
|---|---|---|
| CN | 108839610 A | 11/2018 |
| CN | 111284394 A | 6/2020 |
| DE | 19756574 A1 | 10/1998 |
| DE | 10164193 A1 | 7/2002 |
| DE | 10239150 A1 | 10/2003 |
| DE | 102012200040 A1 | 7/2013 |
| DE | 102012200048 A1 | 7/2013 |
| EP | 1451038 A1 | 9/2004 |
| EP | 15049562 A2 | 2/2005 |
| EP | 3093193 A1 | 11/2016 |
| EP | 3109095 A1 | 12/2016 |
| EP | 3343095 A1 | 7/2018 |
| EP | 3343097 A1 | 7/2018 |
| JP | 200431179 A | 10/2004 |
| KR | 20150134793 A | 12/2015 |
| KR | 20180076209 A | 7/2018 |
| WO | 2013102524 A1 | 7/2013 |
| WO | 2013102526 A1 | 7/2013 |
| WO | 2016046209 A1 | 3/2016 |
| WO | 2016203911 A1 | 12/2016 |
| WO | 2017036807 A1 | 3/2017 |
| WO | 2017073250 A1 | 5/2017 |
| WO | 2017141395 A1 | 8/2017 |

OTHER PUBLICATIONS

Code of Federal Regulations, Title 49, vol. 6, Part 571, Federal Motor Vehicle Safety Standards, 2014, https://www.govinfo.gov/app/details/CFR-2014-title49-vol6/CFR-2014-title49-vol6-part571, Retrieved Jul. 27, 2021, 4 Pages.

Department of Transportation, National Highway Traffic Safety Administration, 49 CFR Part 571, Docket No. NHTSA-2016-0126, Federal Motor Vehicle Safety Standards—V2V Communications, Notice of Proposed Rulemaking, Federal Register, vol. 82, No. 8, Jan. 12, 2017, Proposed Rules, https://www.federalregister.gov/documents/2017/01/12/2016-31059/federal-motor-vehicle-safety-standards-v2v-communications, 166 Pages (in 3 parts).

(56) References Cited

OTHER PUBLICATIONS

Society of Automotive Engineers, SAE J2945/1, On-Board System Requirements for V2V Safety Communications, Mar. 2016, 127 Pages (in 2 parts).
ITE, "Traffic Calming Measures," Institute of Transportation Engineers, Archived from the original on Mar. 20, 2007, URL: https://web.archive.org/web/20170729064350/http:/lwww.ite.org/traffic/hump.asp, Retrieved May 29, 2020, 2 Pages.
Wikipedia, "eCall," url: https://en.wikipedia.org/wiki/Ecall, last edited Jul. 4, 2021, accessed Jul. 12, 2021, 5 Pages.
U.S. National Highway Transportation Safety Administration (NHTSA), "Event Data Recorder," url: https://www.nhtsa.gov/research-data/event-data-recorder#overview-10516, accessed Jul. 12, 2021, 4 Pages.
Allyn, Bobby, "Apple iPhones Can Soon Hold Your ID. Privacy Experts Are On Edge," NPR, Jun. 12, 2021, url: https://www.npr.org/2021/06/12/1005624457/apple-iphones-can-soon-hold-your-id-privacy-experts-are-on-edge, last accessed Sep. 2, 2021, 13 Pages.
Lee, Alicia, "Tell Siri you're getting pulled over and this iPhone shortcut will record your interaction with the police," CNN, Jun. 16, 2020, url: https://www.cnn.com/2020/06/16/us/iphone-police-shortcut-record-tmd/index.html, last accessed Sep. 2, 2021, 6 Pages.
Elassar, Alaa, "The ACLU created an app to help people record police misconduct," CNN, May 31, 2020, url: https://www.cnn.com/2020/05/31/us/aclu-mobile-justice-police-misconduct-app/index.html, last accessed Sep. 2, 2021, 3 Pages.
OnStar Public Safety, https://www.public-safety.onstar.com/emergency-situations/, last accessed Oct. 7, 2021, 9 pages.

\* cited by examiner

SYSTEM AND METHOD FOR PROVIDING AN ALERT TO A DRIVER OF A HOST VEHICLE

TECHNICAL FIELD

The following relates to a system and method for providing an alert to a driver of a host vehicle equipped with a V2X communication system based on V2X system data and real-world mapping data.

BACKGROUND

Vehicle-to-everything (V2X) communication is the passing of information from a vehicle to any entity that may affect the vehicle, and vice versa. V2X is a vehicular communication system that incorporates or includes other more specific types of communication such as Vehicle-to-Infrastructure (V2I), Vehicle-to-Network (V2N), Vehicle-to-Vehicle (V2V), Vehicle-to-Pedestrian (V2P), Vehicle-to-Device (V2D), and Vehicle-to-Grid (V2G). The main motivations for V2X communication are road safety, traffic efficiency, and energy savings.

There are two types of V2X communication technology depending on the underlying technology being used. One is Dedicated Short Range Communication (DSRC) Wireless Local Area Network (WLAN) based, and the other is cellular based (which may be referred to as CV2X). V2X communication may use WLAN technology and work directly between vehicles, which form a vehicular ad-hoc network as two V2X transmitters come within each range of each other. Hence it does not require any infrastructure for vehicles to communicate, which is key to assure safety in remote or little developed areas.

WLAN is particularly well-suited for V2X communication, due to its low latency. It transmits and receives messages known as Cooperative Awareness Messages (CAM) and Decentralized Environmental Notification Messages (DENM) or Basic Safety Message (BSM) at regular intervals (e.g., up to 10 times per second). The data volume of these messages is very low. The radio technology is part of the WLAN 802.11 family of standards developed by the Institute of Electrical and Electronics Engineers (IEEE) and known in the United States as Wireless Access in Vehicular Environments (WAVE) and in Europe as ITS-G5.

The baseline V2X application for vehicle On-Board Units (OBU) works with Basic Safety Messages (BSMs) which contain only latitude, longitude, elevation, speed, heading, acceleration, and yaw rate, of the host vehicle and BSM data received from surrounding vehicles. That is, there is no real-world mapping information in the base V2X application requirements. As a result, the potential exists for false V2X alarms to be generated for a driver of a host vehicle equipped with a V2X communication system when interpreting the existing BSMs. The potential also exists for missing valid V2X alarms to be generated for a driver of a host vehicle equipped with a V2X communication system when interpreting the existing BSMs.

A need therefore exists for an improved system and method for providing an alert to a driver of a host vehicle equipped with a V2X communication system based on V2X system data and mapping data. Such an improved system and method would use real-world mapping information when interpreting existing BSMs to reduce and/or eliminate false V2X alarms generated for a driver of a host vehicle equipped with a V2X communication system. Such an improved system and method would also use real-world mapping information when interpreting existing BSMs to reduce and/or prevent missing valid V2X alarms to be generated for a driver of a host vehicle equipped with a V2X system.

SUMMARY

According to one non-limiting exemplary embodiment described herein, a system is provided for providing an alert to a driver of a host vehicle. The system may comprise a communication unit to be mounted in the host vehicle and configured to receive a vehicle-to-x communication comprising data indicative of a characteristic of a second vehicle. The system may further comprise a controller to be mounted in the host vehicle and provided in communication with the communication unit. The controller may be configured to provide an alert to the driver of the host vehicle based on data indicative of a characteristic of the host vehicle, the data indicative of a characteristic of the second vehicle, and map data for a geographic area associated with the host vehicle and the second vehicle.

According to another non-limiting exemplary embodiment described herein, a method is provided for providing an alert to a driver of a host vehicle. The method comprises receiving a vehicle-to-x communication comprising data indicative of a characteristic of a second vehicle, and receiving a communication comprising map data for a geographic area associated with the host vehicle and the second vehicle. The method further comprises providing an alert to the driver of the host vehicle based on data indicative of a characteristic of the host vehicle, the data indicative of a characteristic of the second vehicle, and the map data for the geographic area associated with the host vehicle and the second vehicle.

A detailed description of these and other non-limiting exemplary embodiments of a system and method for providing an alert to a driver of a host vehicle equipped with a V2X communication system based on V2X system data and real-world mapping data is set forth below together with the accompanying drawings.

DETAILED DESCRIPTION

Figure 1:
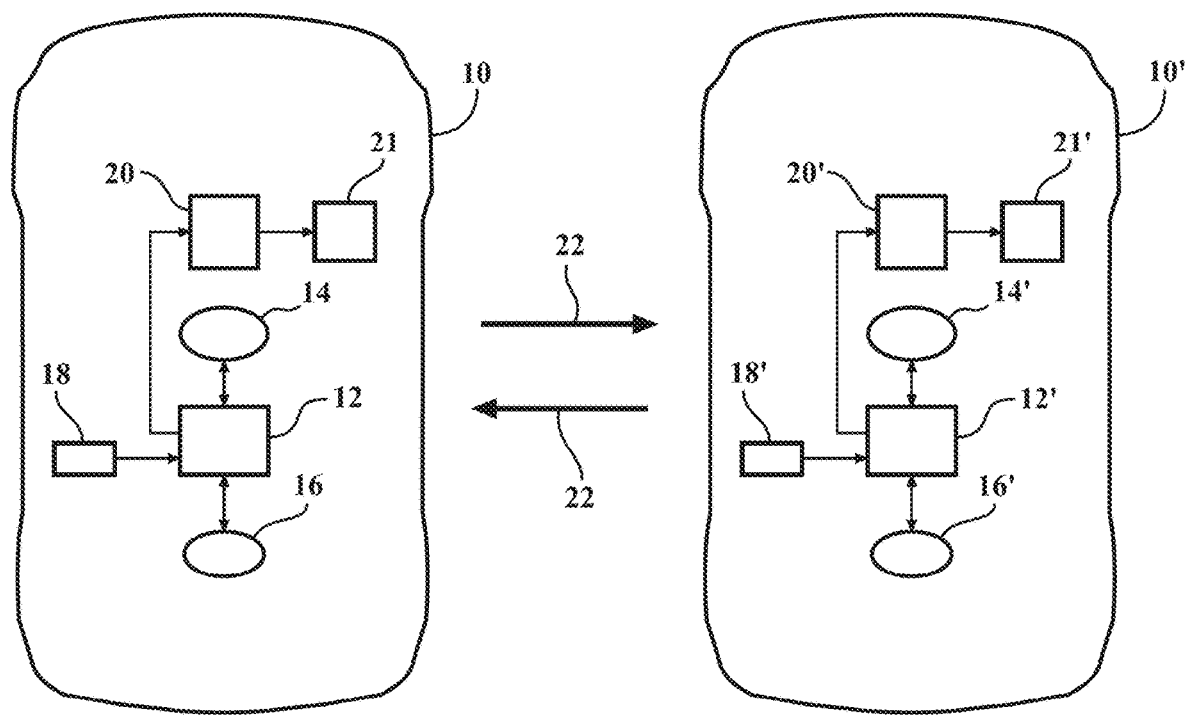
FIG. 1 is a block diagram of non-limiting exemplary vehicles equipped with a non-limiting exemplary V2X communication system for use with the system and method for providing an alert to a driver of a host vehicle equipped with a V2X communication system based on V2X system data and real-world mapping data according to one non-limiting exemplary embodiment of the present disclosure.

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

With reference to the Figures, a more detailed description of non-limiting exemplary embodiments of a system and method for providing an alert to a driver of a host vehicle equipped with a V2X communication system based on V2X system data and real-world mapping data will be provided. For ease of illustration and to facilitate understanding, like reference numerals may be used herein for like components and features throughout the drawings.

As previously described, vehicle-to-everything (V2X) communication is the passing of information from a vehicle to any entity that may affect the vehicle, and vice versa. V2X is a vehicular communication system that incorporates or includes other more specific types of communication such as Vehicle-to-Infrastructure (V2I), Vehicle-to-Network (V2N), Vehicle-to-Vehicle (V2V), Vehicle-to-Pedestrian (V2P), Vehicle-to-Device (V2D), and Vehicle-to-Grid (V2G). V2X communication is designed to improve road safety, traffic efficiency, and energy savings, and may be implemented using Dedicated Short Range Communication (DSRC) Wireless Local Area Network (WLAN) technology, or alternatively cellular technology. V2X communication may use WLAN technology and work directly between vehicles, which form a vehicular ad-hoc network as two V2X transmitters come within each range of each other. Hence it does not require any infrastructure for vehicles to communicate, which is key to assure safety in remote or little developed areas. WLAN is particularly well-suited for V2X communication, due to its low latency. It transmits messages known as Cooperative Awareness Messages (CAM) and Decentralized Environmental Notification Messages (DENM) or Basic Safety Message (BSM). The data volume of these messages is very low. The radio technology is part of the WLAN 802.11 family of standards developed by the Institute of Electrical and Electronics Engineers (IEEE) and known in the United States as Wireless Access in Vehicular Environments (WAVE) and in Europe as ITS-G5.

Referring now to FIG. 1, a block diagram of non-limiting exemplary vehicles equipped with a non-limiting exemplary V2X communication system for use with the system and method for providing an alert to a driver of a host vehicle 10 equipped with a V2X communication system based on V2X system data and real-world mapping data according to one non-limiting exemplary embodiment of the present disclosure is shown. As seen therein, a first vehicle 10 may comprise a V2X module 12, a first antenna 14, a second antenna 16, a Global Positioning System (GPS) or other GNSS unit 18, a controller 20, and a device 21. The V2X module 12 and the first and second antennas 14, 16 may together be referred to or comprise a vehicle On-Board Unit (OBU). The controller 20 may be provided in communication with the device 21 and the V2X module 12, which itself may be provided in communication with the first and second antennas 14, 16 and the GPS 18.

The controller 20 may be configured to provide or generate an alert (which may alternatively be referred to as an alarm, warning, or message) for a driver of the vehicle 10, such as an audible, visual, or tactile alert, in any known fashion. In that regard, the controller 20 may include or be provided in communication with any type of device or component 21 configured to produce such an alert, such as a loudspeaker, chime, lamp, or motor, or any type of known driver assistance system which may be provided with or include such a loudspeaker, chime, lamp, or motor, and may be configured to generate, provide, and/or transmit a signal to such a device to thereby effectuate such an alert.

It should be noted that, while shown in FIG. 1 as separate components, the V2X module 12 and the controller 20 may be integrated into a single unit or module, such as the V2X module 12 itself. In that same regard, while the GPS 18 is shown as provided in communication with the V2X module 12, the GPS 18 may alternatively be provided in communication with the controller 20 and/or a unit or module in which the V2X module 12 and controller 20 are integrated, as previously described.

Still referring to FIG. 1, a second vehicle 10' may similarly comprise a V2X module 12', a first antenna 14', a second antenna 16', a GPS or other GNSS unit 18', a controller 20', and a device 21'. The V2X module 12', first and second antennas 14', 16', GPS 18', controller 20', and device 21' of the second vehicle 10' may be provided in communication and configured similarly to the V2X module 12, the first and second antennas 14, 16, the GPS 18, and the controller 20 of the first vehicle 10 as described above.

It should be noted that either of the first or second vehicles 10, 10' may be referred to as a host vehicle. It should also be noted that the description herein of the system and method of the present disclosure in connection with the first and second vehicles 10, 10' is exemplary only, and that the system and method of the present disclosure may be utilized or implemented with any number of vehicles.

Each of the V2X modules 12, 12' may be configured to enable and control communication between the first and second vehicles 10, 10' (i.e., V2V communication) or between the first or second vehicle 10, 10' and another node or device (e.g., Vehicle-to-Infrastructure (V2I), Vehicle-to-Network (V2N), Vehicle-to-Pedestrian (V2P), Vehicle-to-Device (V2D), or Vehicle-to-Grid (V2G)). Such communication is accomplished utilizing radio frequency signals for transmission of data according to known techniques, protocols, and/or standards associated with such communication. In that regard, the first and/or second antennas 14, 14', 16, 16' of the first and second vehicles 10, 10' may be configured for transmitting and receiving DSRC WLAN or cellular radio frequency signals. Similarly, the GPS or other GNSS units 18, 18' of the first and second vehicles 10, 10' may be configured and operate in any known fashion, including providing for wireless GNSS communication.

Each V2X module 12, 12' and/or V2X module 12, 12' with antennas 14, 14', 16, 16' may also be referred to as a communication unit that may be configured to transmit and receive wireless V2X radio frequency communications 22 as described herein. Similarly, each controller 20, 20' may include a communication interface or communication unit that may be configured to receive wired communication signals from its respective V2X module 12, 12' over any vehicle bus, such as a Controller Area Network (CAN) bus.

As those skilled in the art will understand, the V2X modules 12, 12', antennas 14, 14, 16, 16', GPS 18, 18', controllers 20, 20', and/or devices 21, 21' of the first and second vehicles 10, 10', as well as any other module, controller, unit, component, system, subsystem, interface, sensor, device, or the like described herein may individually, collectively, or in any combination comprise appropriate circuitry, such as one or more appropriately programmed processors (e.g., one or more microprocessors including central processing units (CPU)) and associated memory, which may include stored operating system software, firmware, and/or application software executable by the processor(s) for controlling operation thereof and for performing the particular algorithm or algorithms represented by the various functions and/or operations described herein, including interaction between and/or cooperation with each other. One or more of such processors, as well as other circuitry and/or hardware, may be included in a single Application-Specific Integrated Circuitry (ASIC), or several processors and various circuitry and/or hardware may be distributed among several separate components, whether individually packaged or assembled into a System-on-a-Chip (SoC). The V2X modules 12, 12', 12', antennas 14, 14, 16, 16', GPS 18, 18', controllers 20, 20', and/or devices 21, 21' may therefore comprise a processor and an associated storage medium having stored computer executable instructions for performing the particular algorithm or algorithms represented by the various functions and/or operations described herein.

As previously noted, all V2X communications 22 include a Basic Safety Message (BSM). As part of each BSM, a DSRC device, such as V2X module 12, 12' must transmit (i) Longitudinal and latitudinal location within 1.5 meters of the actual position at a Horizontal Dilution of Precision (HDOP) smaller than 5 within the 1 sigma absolute error; and (ii) Elevation location within 3 meters of the actual position at a Horizontal Dilution of Precision (HDOP) smaller than 5 within the 1 sigma absolute error. As part of each BSM, a DSRC device must also transmit speed, heading, acceleration, and yaw rate. Speed must be reported in increments of 0.02 m/s, within 1 km/h (0.28 m/s) of actual vehicle speed. Heading must be reported accurately to within 2 degrees when the vehicle speed is greater than 12.5 m/s (~28 mph), and to within 3 degrees when the vehicle speed is less than or equal to 12.5 m/s. Additionally, when the vehicle speed is below 1.11 m/s (~2.5 mph), the DSRC device must latch the current heading and transmit the last heading information prior to the speed dropping below 1.11 m/s. The DSRC device is to unlatch the latched heading when the vehicle speed exceeds 1.39 m/s (~3.1 mph) and transmit a heading within 3 degrees of its actual heading until the vehicle reaches a speed of 12.5 m/s where the heading must be transmitted at 2 degrees accuracy of its actual heading. Horizontal (longitudinal and latitudinal) acceleration must be reported accurately to 0.3 m/s$^2$, and vertical acceleration must be reported accurately to 1 m/s$^2$. Yaw rate must be reported accurately to 0.5 degrees/second.

In addition, a Path History data frame will be transmitted as a required BSM element at the operational frequency of the BSM transmission. The Path History data frame requires a history of past vehicles Global Navigation Satellite System (GNSS) locations as dictated by GNSS data elements including Coordinated Universal Time (UTC) time, latitude, longitude, heading, elevation sampled at a periodic time interval of 100 ms and interpolated in-between by circular arcs, to represent the recent movement of the vehicle over a limited period of time or distance. Path History points should be incorporated into the Path History data frame such that the perpendicular distance between any point on the vehicle path and the line connecting two consecutive PH points shall be less than 1 m. The number of Path History points that a vehicle should report is the minimum number of points so that the represented Path History distance (i.e., the distance between the first and last Path History point) is at least 300 m and no more than 310 m, unless initially there is less than 300 m of Path History. If the number of Path History points needed to meet both the error and distance requirements stated above exceeds the maximum allowable number of points (23), the Path History data frame shall be populated with only the 23 most recent points from the computed set of points. A Path History data frame shall be populated with time-ordered Path History points, with the first Path History point being the closest in time to the current UTC time, and older points following in the order in which they were determined.

Path Prediction trajectories will also be transmitted as a required BSM element at the operational frequency of the BSM transmission. Trajectories in a Path Prediction data frame are represented, at a first order of curvature approximation, as a circle with a radius, R, and an origin located at (0,R), where the x-axis is aligned with the perspective of the transmitting vehicle and normal to the vertical axis of the vehicle. The radius, R, will be positive for curvatures to the right when observed from the perspective of the transmitting vehicle, and radii exceeding a maximum value of 32,767 are to be interpreted as a "straight path" prediction by receiving vehicles. When a DSRC device is in steady state conditions over a range from 100 m to 2,500 m in magnitude, the subsystem will populate the Path Prediction data frame with a calculated radius that has less than 2% error from the actual radius. For the purposes of this performance requirement, steady state conditions are defined as those which occur when the vehicle is driving on a curve with a constant radius and where the average of the absolute value of the change of yaw rate over time is smaller than 0.5 deg/s$^2$. After a transition from the original constant radius (R1) to the target constant radius (R2), the subsystem shall repopulate the Path Prediction data frame within four seconds under the maximum allowable error bound defined above.

The foregoing and other details concerning V2X communications relating to Federal Motor Vehicle Safety Standards are set forth at 49 CFR (Code of Federal Regulations) Part 571 as well as the Notice of Proposed Rulemaking (NPRM), National Highway Transportation Safety Association Docket No. NHTSA-2016-0126, which are incorporated herein by reference in their entireties. Also incorporated herein by reference in its entirety is the DSRC standard of the Society of Automotive Engineers, SAE J2945/1, relating to on-board system requirements for V2V safety communications, including FIGS. 27 and 30 concerning concise and actual path history representation and representation of estimated radius calculations.

As previously described, the baseline V2X application for vehicle On-Board Units (OBU) works with Basic Safety Messages (BSMs) which contain only latitude, longitude, elevation, speed, heading, acceleration, and yaw rate, of the host vehicle 10 and BSM data received from surrounding vehicles. That is, there is no real-world mapping information in the base V2X application requirements.

Figure 2A:
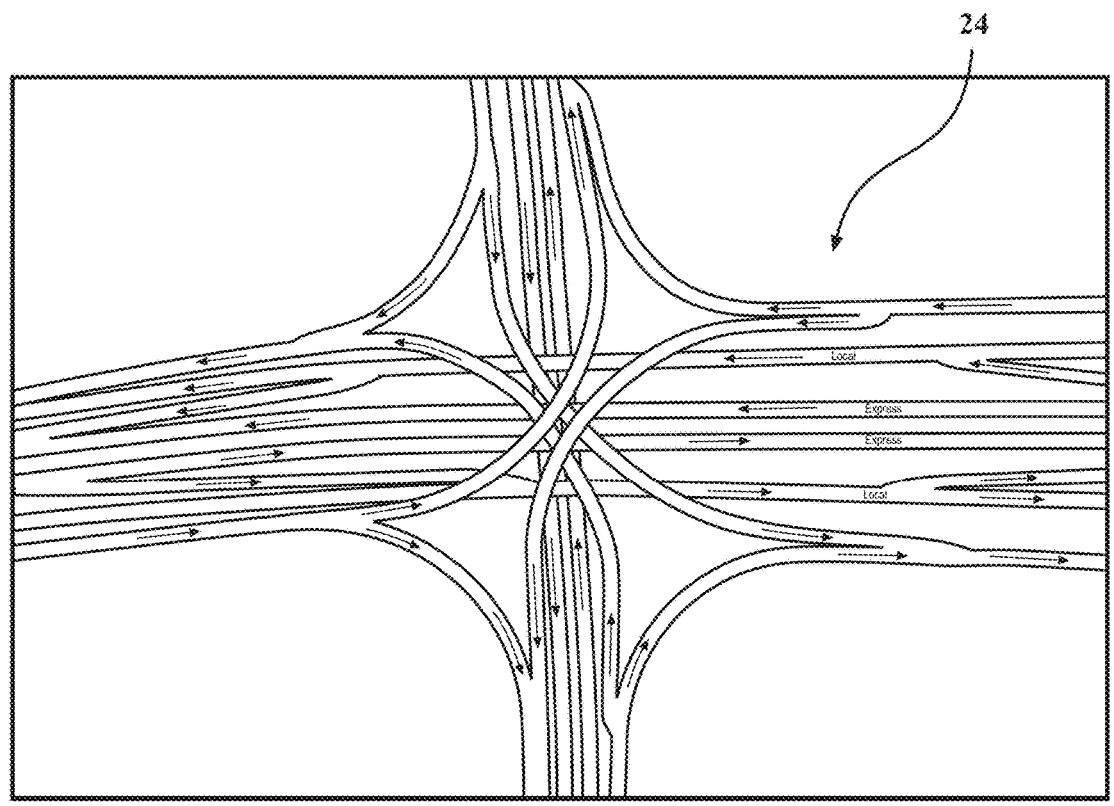
FIGS. 2A and 2B are non-limiting exemplary embodiments of real-world mapping data for use with the system and method for providing an alert to a driver of a host vehicle equipped with a V2X communication system based on V2X system data and real-world mapping data according to one non-limiting exemplary embodiment of the present disclosure.
Figure 2B:
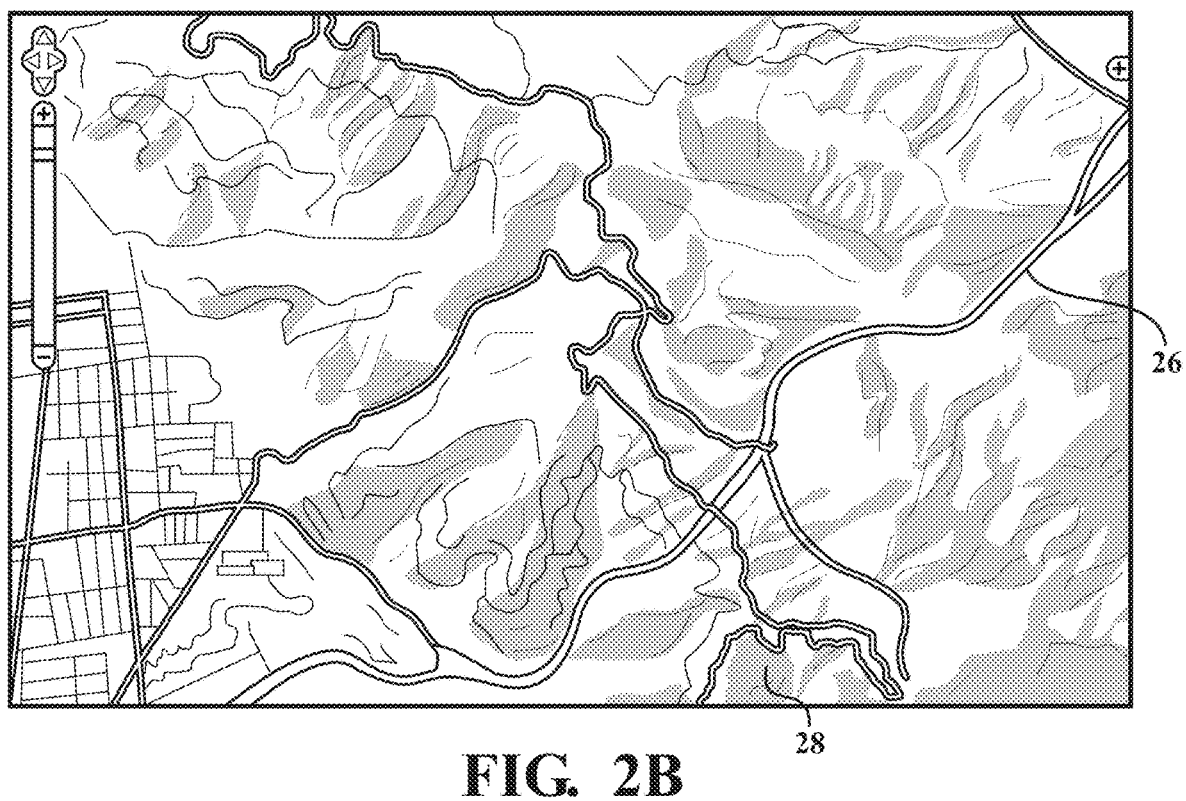

Referring now to FIGS. 2A and 2B, non-limiting exemplary embodiments of real-world mapping data are shown for use with the system and method for providing an alert to a driver of a host vehicle 10 equipped with a V2X communication system based on V2X system data and real-world mapping data according to one non-limiting exemplary embodiment of the present disclosure. More specifically, FIG. 2A illustrates, for example, highway road and ramp geometries 24, while FIG. 2B illustrates, for example, topographical information and information concerning a river 26. In that regard, as previously described, the base V2X application requirements do not include real-world mapping information. For example, none of the following are included in base V2X application requirements: (i) street, highway, or road geometries 24; (ii) intersection, roundabout, cloverleaf, or highway ramp geometries 24; (iii) bridge or tunnel geometries (e.g. crossing over, or under) of intersecting roads; (iv) contour or topographical information 28; or (v) information about bodies of water (e.g., rivers, lakes, oceans) 26.

Figure 3A:
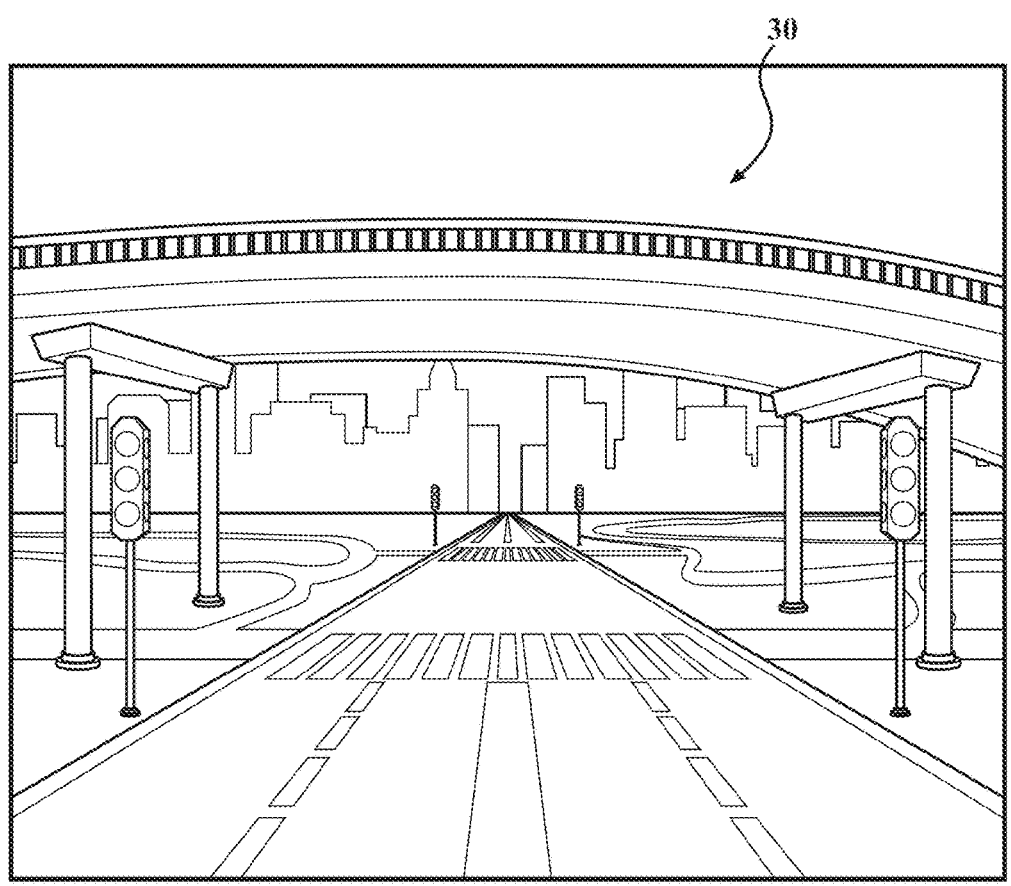
FIGS. 3A-3E are illustration of non-limiting exemplary driving environments which may be associated with the system and method for providing an alert to a driver of a host vehicle equipped with a V2X communication system based on V2X system data and real-world mapping data according to one non-limiting exemplary embodiment of the present disclosure.
Figure 3B:
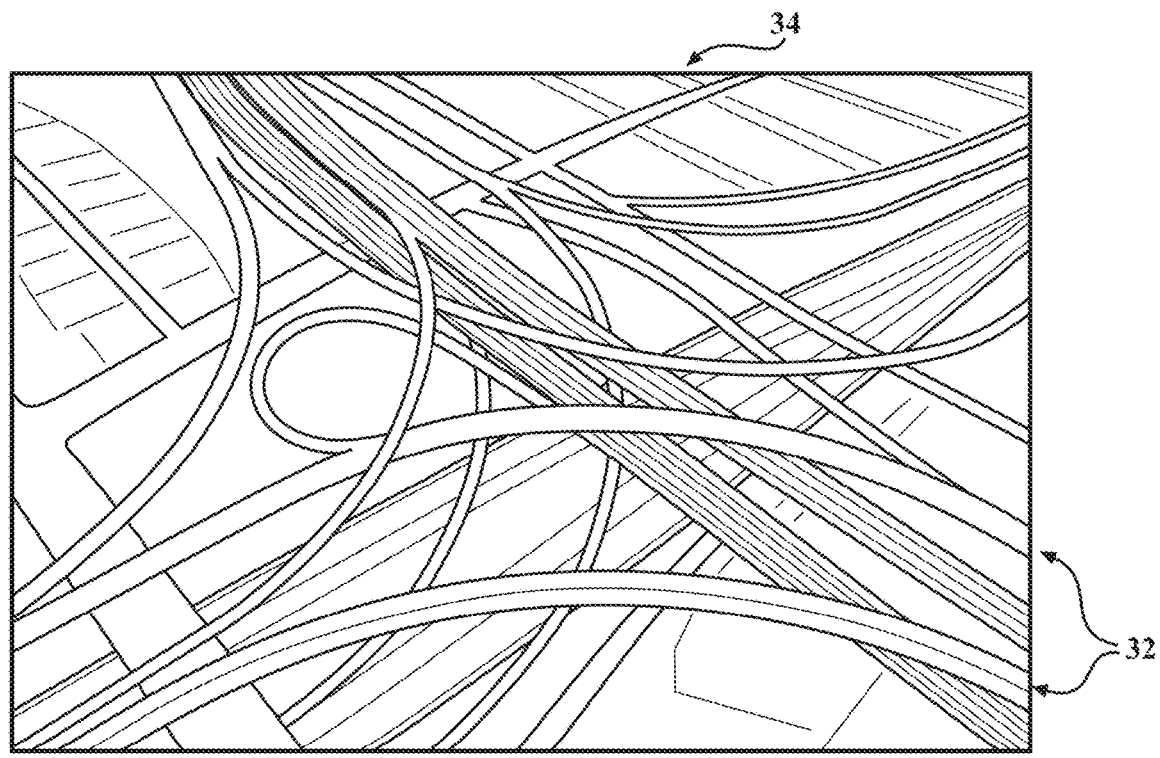
Figure 3C:
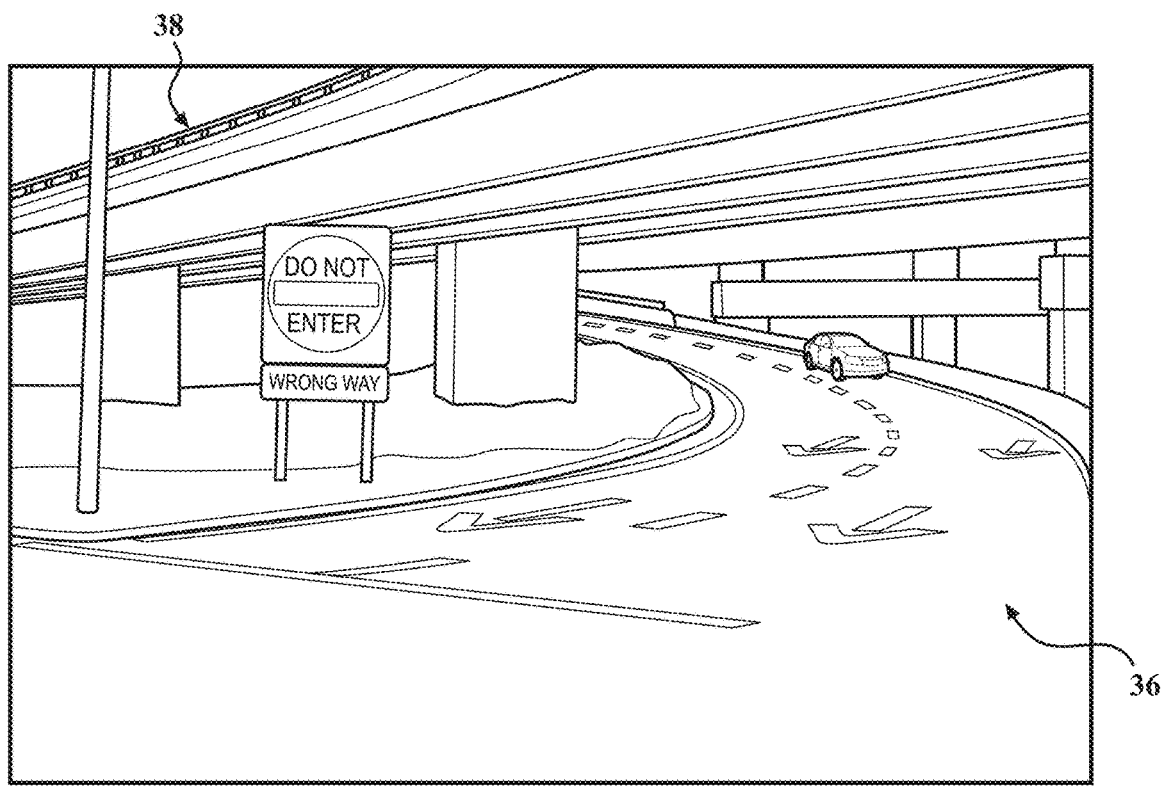
Figure 3D:
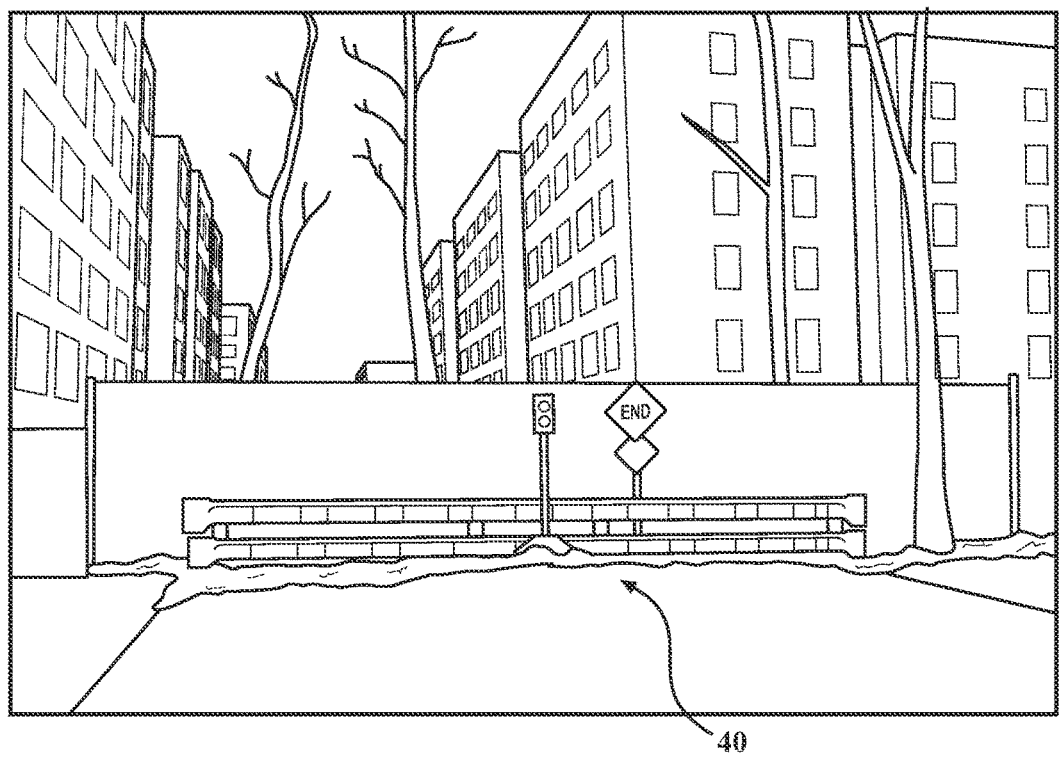
Figure 3E:
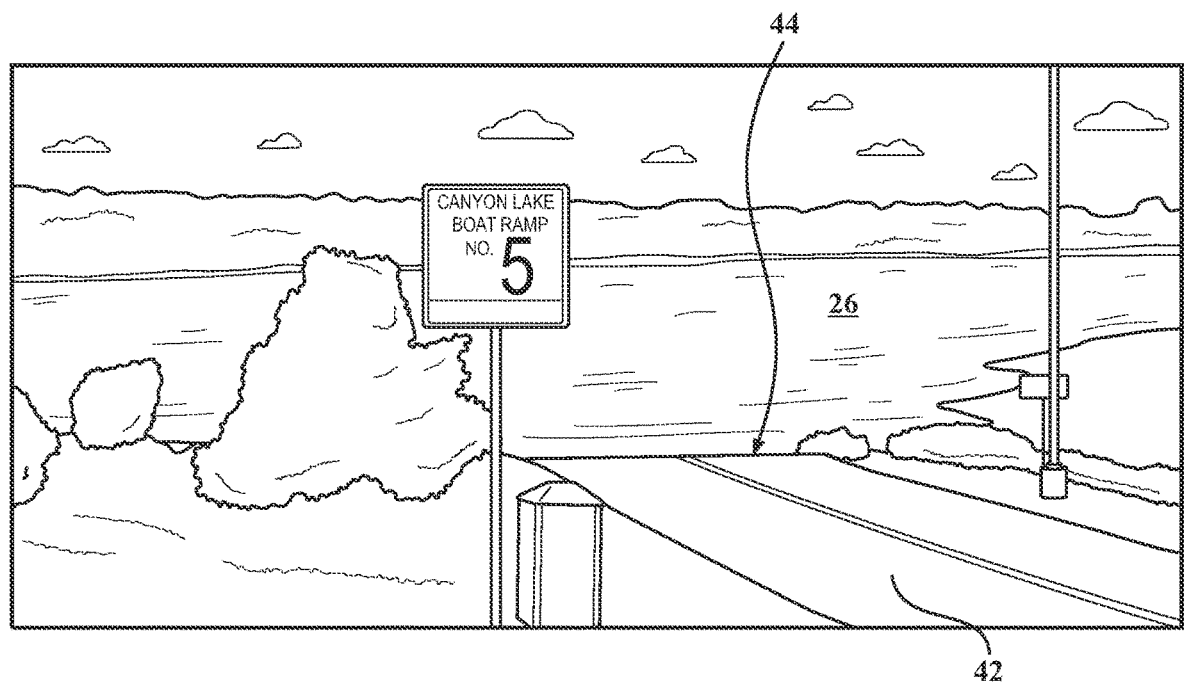

Referring next to FIGS. 3A-3E, non-limiting exemplary driving environments are illustrated which may be associated with the system and method for providing an alert to a driver of a host vehicle 10 equipped with a V2X communication system based on V2X system data and real-world mapping data according to one non-limiting exemplary embodiment of the present disclosure. More specifically, FIG. 3A illustrates an overpass 30, while FIG. 3B illustrates non-intersecting ramps 32 at a highway interchange 34. FIG. 3C illustrates a one-way street 36, while also showing an overpass 38. FIG. 3D illustrates a dead end of a roadway 40, while FIG. 3E illustrates a roadway 42 ending at a shoreline 44 of a body of water 26, such as may be used as a boat ramp.

As previously described, one consequence of base V2X application requirements lacking such real-world mapping information is the potential for false V2X alarms to be generated for a driver of a host vehicle 10 equipped with a V2X communication system when interpreting the existing BSMs. Such false V2X alarms may, for example, include: (i) an apparent, impending, or upcoming collision with vehicles on intersecting paths, while a bridge 30 or tunnel is involved; (ii) an apparent, impending, or upcoming collision with vehicles on intersecting paths, but the two roads 32 do not actually intersect; and (iii) an apparent, impending, or upcoming lane obstruction ahead of host vehicle 10 with parallel paths or merging paths.

Another previously described consequence of base V2X application requirements lacking such real-world mapping information is the potential for missing valid V2X alarms to be generated for a driver of a host vehicle 10 equipped with a V2X communication system when interpreting the existing BSMs. Such missing V2X alarms may, for example, include: (i) proceeding to the end 40 of a dead end street; (ii) proceeding the wrong way on a one-way street 36, or limited access highway, where oncoming vehicles have the right-of-way; and (iii) proceeding into access points 44 for lakes, rivers, and oceans (e.g., boat launches, beaches).

To reduce, eliminate, and/or prevent such false or missing V2X alarms, the system and method of the present disclosure include real-world mapping data into the V2X application, which real-world mapping data may be obtained from or provided by a remote or cloud server. Such real-world mapping data may comprise or include: (i) geometries of existing roads 24; (ii) elevations/depressions of overpasses 30, bridges, and tunnels; (iii) contours and topological data of the surrounding terrain 28; and/or (iv) boundaries 44 for bodies of water 26 (e.g., shorelines).

The system and method of the present disclosure may utilize such real-world mapping data to enhance existing BSM processing with correlation to that real-world mapping data. For example, the system and method of the present disclosure may: (i) determine three dimensional trajectories of surrounding vehicles, for overpasses 30, bridges, and tunnels; (ii) determine boundaries or end-points 40 of roads, for dead-ends or shorelines 44; and/or (iii) determine direction of travel versus one-way streets 36, limited access highways, etc.

More specifically, referring now to FIGS. 1-3E, the present disclosure describes a system for providing an alert to a driver of a host vehicle 10. The system may comprise a communication unit 12 to be mounted in the host vehicle 10 and configured to receive a vehicle-to-x communication 22 which may comprise data indicative of a characteristic of a second vehicle 10'. The system may further comprise a controller 20 to be mounted in the host vehicle 10 and provided in communication with the communication unit 12. The controller 20 may be configured to provide an alert to the driver of the host vehicle 10 based on data indicative of a characteristic of the host vehicle 10, the data indicative of a characteristic of the second vehicle 10', and real-world mapping data, which may be referred to as map data, for a geographic area associated with the host vehicle 10 and the second vehicle 10'. In that regard, the geographic area associated with the host vehicle 10 and the second vehicle 10' may comprise a geographic area as defined, selected, or generated in any known fashion, such as by a known vehicle navigation system.

The data indicative of the characteristic of the host vehicle 10 may comprise data indicative of a latitude, longitude, elevation, speed, heading, acceleration, yaw rate, and/or path history of the host vehicle 10. Similarly, the data indicative of the characteristic of the second vehicle 10' may comprise data indicative of a latitude, longitude, elevation, speed, heading, acceleration, yaw rate, and/or path history of the second vehicle 10'. In that regard, the communication unit 12 of the host vehicle 10 may comprise an on-board unit (OBU) of the host vehicle 10 and the vehicle-to-x communication 22 may comprise a basic safety message (BSM).

The map data may comprise data indicative of a road geometry 24, a road intersection, a road elevation 30, a topography 28, a road boundary location 40 and/or a shoreline location 44 within the geographic area associated with the host vehicle 10 and the second vehicle 10'. In that regard, the system of the present disclosure may further comprise another communication unit to be mounted in the host vehicle 10 which may be configured to receive a communication comprising the map data for the geographic area associated with the host vehicle 10 and the second vehicle 10', such as a wireless communication, wherein the map data may be stored at a remote or cloud server and retrieved for transmission to and receipt by the host vehicle 10 via a known communication system. Such a host vehicle communication unit configured to receive a communication comprising the map data for the geographic area associated with the host vehicle 10 and the second vehicle 10' may comprises a vehicle navigation system and/or a global positioning unit 18.

Moreover, the controller 20 may be further configured to determine a trajectory (which may alternatively be referred to as a path) of the host vehicle 10 based on the data indicative of a characteristic of the host vehicle 10. In that regard, the trajectory of the host vehicle 10 may be determined in any known fashion, such as that employed in base V2X applications. The controller 20 may be further configured to determine or receive (such as from the GPS unit 18 or a host vehicle navigation system) a location of a roadway dead end 40 or a shoreline access point 44 based on the map data. The controller 20 may be further configured to compare the determined trajectory of the host vehicle 10 to the location of the roadway dead end 40 or the shoreline access point 44, and to provide an alert to the driver of the host vehicle 10 indicating that the host vehicle 10 is proceeding to the roadway dead end 40 or the shoreline access point 44 when the trajectory of the host vehicle 10 intersects the location of the roadway dead end 40 or the shoreline access point 44.

The controller 20 may further be configured to determine a direction of travel of the host vehicle 10 based on the data indicative of a characteristic of the host vehicle 10. Here again, the direction of travel of the host vehicle 10 may be determined in any known fashion, such as that employed in base V2X applications. Alternatively, the controller 20 may be configured to receive a direction of travel of the host vehicle 10, such as from the GPS unit 18 or a host vehicle navigation system. The controller 20 may be further configured to determine or receive (such as from the GPS unit 18 or a host vehicle navigation system) a designated travel direction of a roadway on which the host vehicle 10 is traveling based on the map data. The controller 20 may be further configured to compare the host vehicle travel direction to the designated travel direction of the roadway, and provide an alert to the driver of the host vehicle 10 indicating that the host vehicle 10 is traveling a wrong way on the roadway when the host vehicle travel direction fails to match the designated travel direction of the roadway.

In that same regard, the controller 20 may be further configured to determine a direction of travel of the second vehicle 10' based on the data indicative of a characteristic of the second vehicle 10'. The controller 20 may be further configured to compare the host vehicle travel direction to the second vehicle travel direction, compare the second vehicle travel direction to the designated travel direction of the roadway, and provide an alert to the driver of the host vehicle 10 indicating that the host vehicle 10 is traveling a wrong way on the roadway when the host vehicle travel direction fails to match the second vehicle travel direction and/or the designated travel direction of the roadway.

Still further, the controller 20 to be mounted in the host vehicle 10 may also be configured to determine a three-dimensional trajectory of the host vehicle 10 based on the data indicative of a characteristic of the host vehicle 10 and the map data, and to determine a three-dimensional trajectory of the second vehicle 10' based on the data indicative of a characteristic of the second vehicle 10 and the map data. In that regard, the three-dimensional trajectories of the host vehicle 10 and the second vehicle 10' may be determined in any known fashion, which may be based on parameters such as speed, elevation, heading, and path history data associated with the host vehicle 10 and the second vehicle 10', and such trajectories may likewise be matched or correlated with a roadway indicated by the mapping data in any known fashion, such as that employed in known vehicle navigation systems.

The controller 20 may be further configured to compare the three-dimensional trajectory of the host vehicle 10 to the three-dimensional trajectory of the second vehicle 10', and to provide an alert to the driver of the host vehicle indicating an apparent, impending, or upcoming collision between the host vehicle 10 and the second when the three-dimensional trajectory of the host vehicle 10 intersects the three-dimensional trajectory of the second vehicle 10'. In that regard, the controller 20 may be configured to determine an intersection of the three-dimensional trajectories of the host vehicle 10 and the second vehicle 10' warranting an alert in any known fashion, which may be based on parameters such as the distance between the host vehicle 10 and the point of intersection of the three-dimensional trajectories of the host vehicle 10 and the second vehicle 10', the distance between the second vehicle 10' and the point of intersection of the three-dimensional trajectories of the host vehicle 10 and the second vehicle 10', the speed and acceleration of the host vehicle 10, and the speed and acceleration of the second vehicle 10'.

Moreover, the controller 20 to be mounted in the host vehicle 10 may be further configured to determine a trajectory of the host vehicle 10 based on the data indicative of a characteristic of the host vehicle 10. In that regard, such a determined trajectory of the host vehicle 10 may be a two- or three-dimensional trajectory and may be determined in any know fashion, such as that employed in V2X applications or other applications, which may be based on parameters as previously described. The controller 20 may be further configured to determine a position or location of the second vehicle 10' based on the data indicative of a characteristic of the second vehicle 10' and/or the map data, which position or location may be a two- or three-dimensional position or location, and to compare the determined trajectory of the host vehicle 10 to the position or location of the second vehicle 10'. The controller may be further configured to provide an alert to the driver of the host vehicle 10 indicating an apparent, impending, or upcoming collision of the host vehicle 10 with the second vehicle 10' when the trajectory of the host vehicle 10 intersects the position or location of the second vehicle 10'.

Still referring to FIGS. 1-3E, the present disclosure also describes a method for providing an alert to a driver of a host vehicle 10. The method may comprise receiving a vehicle-to-x communication comprising data indicative of a characteristic of a second vehicle 10', receiving a communication comprising map data for a geographic area associated with the host vehicle 10 and the second vehicle 10', and providing an alert to the driver of the host vehicle 10 based on data indicative of a characteristic of the host vehicle 10, the data indicative of a characteristic of the second vehicle 10', and the map data for the geographic area associated with the host vehicle 10 and the second vehicle 10'.

In that regard, receiving a vehicle-to-x communication comprising data indicative of a characteristic of a second vehicle 10' may comprise receiving, at a first communication unit 12 to be mounted in the host vehicle 10, a vehicle-to-x communication comprising data indicative of a characteristic of a second vehicle 10'. Similarly, receiving a communication comprising map data for a geographic area may comprise receiving, at a second communication unit to be mounted in the host vehicle 10, a communication comprising map data for a geographic area associated with the host vehicle 10 and the second vehicle 10'. Still further, providing an alert to the driver of the host vehicle 10 may comprise providing, by a controller 20 to be mounted in the host vehicle 10, an alert to the driver of the host vehicle 10 based on data indicative of a characteristic of the host vehicle 10, the data indicative of a characteristic of the second vehicle 10', and the map data for the geographic area associated with the host vehicle 10 and the second vehicle 10'.

The method of the present disclosure may further comprise determining a trajectory of the host vehicle 10 based on the data indicative of a characteristic of the host vehicle 10. Once again, the trajectory of the host vehicle 10 may be determined in any known fashion, such as that employed in base V2X applications. The method may further comprise determining or receiving (such as from the GPS unit 18 or a host vehicle navigation system) a location of a roadway dead end 40 or a shoreline access point 44 based on the map data. The method may further comprise comparing the determined trajectory of the host vehicle 10 to the location of the roadway dead end 40 or the shoreline access point 44, and providing an alert to the driver of the host vehicle 10 indicating that the host vehicle 10 is proceeding to the roadway dead end 40 or the shoreline access point 44 when the trajectory of the host vehicle 10 intersects the location of the roadway dead end 40 or the shoreline access point 44.

Still further, the method may comprise determining a direction of travel of the host vehicle 10 based on the data indicative of a characteristic of the host vehicle 10. Here again, the direction of travel of the host vehicle 10 may be determined in any known fashion, such as that employed in base V2X applications. Alternatively, the method may comprise receiving a direction of travel of the host vehicle 10, such as from the GPS unit 18 or a host vehicle navigation system. The method may further comprise determining or receiving (such as from the GPS unit 18 or a host vehicle navigation system) a designated travel direction of a roadway on which the host vehicle 10 is traveling based on the map data. The method may further comprise comparing the host vehicle travel direction to the designated travel direction of the roadway on which the host vehicle 10 is traveling, and providing an alert to the driver of the host vehicle 10 indicating that the host vehicle 10 is traveling a wrong way on the roadway when the host vehicle travel direction fails to match the designated travel direction of the roadway.

In that same regard, the method may further comprise determining a direction of travel of the second vehicle 10' based on the data indicative of a characteristic of the second vehicle 10' and comparing the host vehicle travel direction to the second vehicle travel direction. The method may still further comprise comparing the second vehicle travel direction to the designated travel direction of the roadway, and providing an alert to the driver of the host vehicle 10 indicating that the host vehicle 10 is traveling a wrong way on the roadway when the host vehicle travel direction fails to match the second vehicle travel direction and/or the designated travel direction of the roadway.

The method may further comprise determining a three-dimensional trajectory of the host vehicle 10 based on the data indicative of a characteristic of the host vehicle 10 and the map data, and determining a three-dimensional trajectory of the second vehicle 10' based on the data indicative of a characteristic of the second vehicle 10' and the map data. Once again, the three-dimensional trajectories of the host vehicle 10 and the second vehicle 10' may be determined in any known fashion, which may be based on parameters such as speed, elevation, heading, and path history data associated with the host vehicle 10 and the second vehicle 10', and such trajectories may likewise be matched or correlated with a roadway indicated by the mapping data in any known fashion, such as that employed in known vehicle navigation systems.

The method may still further comprise comparing the three-dimensional trajectory of the host vehicle 10 to the three-dimensional trajectory of the second vehicle 10', and providing an alert to the driver of the host vehicle 10 indicating an apparent, impending, or upcoming collision between the host vehicle 10 and the second vehicle 10' when the three-dimensional trajectory of the host vehicle 10 intersects the three-dimensional trajectory of the second vehicle 10'. Here again, determining an intersection of the three-dimensional trajectories of the host vehicle 10 and the second vehicle 10' warranting an alert may be performed or accomplished in any known fashion, which may be based on parameters such as the distance between the host vehicle 10 and the point of intersection of the three-dimensional trajectories of the host vehicle 10 and the second vehicle 10', the distance between the second vehicle 10' and the point of intersection of the three-dimensional trajectories of the host vehicle 10 and the second vehicle 10', the speed and acceleration of the host vehicle 10, and the speed and acceleration of the second vehicle 10'.

Moreover, the method may further comprise determining a trajectory of the host vehicle 10 based on the data indicative of a characteristic of the host vehicle 10. In that regard, such a determined trajectory of the host vehicle 10 may be a two- or three-dimensional trajectory and may be determined in any know fashion, such as that employed in V2X applications or other applications, which may be based on parameters as previously described. The method may further comprise determining a position or location of the second vehicle 10' based on the data indicative of a characteristic of the second vehicle 10' and/or the map data, which position or location may be a two- or three-dimensional position or location, and comparing the trajectory of the host vehicle 10 to the position or location of the second vehicle 10'. The method may still further comprise providing an alert to the driver of the host vehicle 10 indicating an apparent, impending, or upcoming collision of the host vehicle 10 with the second vehicle 10' when the trajectory of the host vehicle 10 intersects the position of the second vehicle 10'.

As is readily apparent from the foregoing, various non-limiting embodiments of a system and method for providing an alert to a driver of a host vehicle 10 equipped with a V2X communication system based on V2X system data and real-world mapping data have been described. The system and method of the present disclosure use real-world mapping information when interpreting existing BSMs to reduce and/or eliminate false V2X alarms generated for a driver of a host vehicle 10 equipped with a V2X communication system. The system and method of the present disclosure also use real-world mapping information when interpreting existing BSMs to reduce and/or prevent missing valid V2X alarms to be generated for a driver of a host vehicle 10 equipped with a V2X system.

While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A system for providing an alert to a driver of a host vehicle, the system comprising:
    a communication unit to be mounted in the host vehicle and configured to receive a vehicle-to-x communication comprising data indicative of a characteristic of a second vehicle; and
    a controller to be mounted in the host vehicle and provided in communication with the communication unit, wherein the controller is configured to provide an alert to the driver of the host vehicle based on data indicative of a characteristic of the host vehicle, the data indicative of a characteristic of the second vehicle, and map data for a geographic area associated with the host vehicle and the second vehicle;
    wherein the controller is further configured to:
        determine a direction of travel of the host vehicle based on the data indicative of a characteristic of the host vehicle;
        determine a direction of travel of the second vehicle based on the data indicative of a characteristic of the second vehicle;
        determine a designated travel direction of a roadway on which the host vehicle is traveling based on the map data;
        compare the host vehicle travel direction to the second vehicle travel direction;
        compare the host vehicle travel direction to the designated travel direction of the roadway;

compare the second vehicle travel direction to the designated travel direction of the roadway;

provide an alert to the driver of the host vehicle indicating that the host vehicle is traveling a wrong way on the roadway when the host vehicle travel direction fails to match the designated travel direction of the roadway; and provide another alert to the driver of the host vehicle indicating that the host vehicle is traveling a wrong way on the roadway when the host vehicle travel direction fails to match the second vehicle travel direction and the designated travel direction of the roadway.

2. The system of claim 1 wherein the data indicative of the characteristic of the host vehicle comprises data indicative of a latitude, longitude, elevation, speed, heading, acceleration, yaw rate, and/or path history of the host vehicle, and wherein the data indicative of the characteristic of the second vehicle comprises data indicative of a latitude, longitude, elevation, speed, heading, acceleration, yaw rate, and/or path history of the second vehicle.

3. The system of claim 2 wherein the communication unit comprises an on-board unit and the vehicle-to-x communication comprises a basic safety message.

4. The system of claim 1 wherein the map data comprises data indicative of a road geometry, a road intersection, a road elevation, a topography, a road boundary location and/or a shoreline location.

5. The system of claim 1 further comprising another communication unit to be mounted in the host vehicle and configured to receive a communication comprising the map data for the geographic area associated with the host vehicle and the second vehicle.

6. The system of claim 5 wherein the another communication unit comprises a global positioning unit.

7. The system of claim 1 wherein the controller is further configured to:
determine a trajectory of the host vehicle based on the data indicative of a characteristic of the host vehicle;
determine a location of a roadway dead end or a shoreline access point based on the map data;
compare the trajectory of the host vehicle to the location of the roadway dead end or the shoreline access point; and
provide an alert to the driver of the host vehicle indicating that the host vehicle is proceeding to the roadway dead end or the shoreline access point when the trajectory of the host vehicle intersects the location of the roadway dead end or the shoreline access point.

8. The system of claim 1 wherein the controller is further configured to:
determine a three-dimensional trajectory of the host vehicle based on the data indicative of a characteristic of the host vehicle and the map data;
determine a three-dimensional trajectory of the second vehicle based on the data indicative of a characteristic of the second vehicle and the map data;
compare the three-dimensional trajectory of the host vehicle to the three-dimensional trajectory of the second vehicle; and
provide an alert to the driver of the host vehicle indicating an apparent collision between the host vehicle and the second when the three-dimensional trajectory of the host vehicle intersects the three-dimensional trajectory of the second vehicle.

9. The system of claim 1 wherein the controller is further configured to:
determine a trajectory of the host vehicle based on the data indicative of a characteristic of the host vehicle;
determine a position of the second vehicle based on the data indicative of a characteristic of the second vehicle and the map data;
compare the trajectory of the host vehicle to the position of the second vehicle; and
provide an alert to the driver of the host vehicle indicating an apparent collision of the host vehicle with the second vehicle when the trajectory of the host vehicle intersects the position of the second vehicle.

10. A method for providing an alert to a driver of a host vehicle, the method comprising:
receiving a vehicle-to-x communication comprising data indicative of a characteristic of a second vehicle;
receiving a communication comprising map data for a geographic area associated with the host vehicle and the second vehicle;
providing an alert to the driver of the host vehicle based on data indicative of a characteristic of the host vehicle, the data indicative of a characteristic of the second vehicle, and the map data for the geographic area associated with the host vehicle and the second vehicle;
determining a direction of travel of the host vehicle based on the data indicative of a characteristic of the host vehicle;
determining a direction of travel of the second vehicle based on the data indicative of a characteristic of the second vehicle;
determining a designated travel direction of a roadway on which the host vehicle is traveling based on the map data;
comparing the host vehicle travel direction to the second vehicle travel direction;
comparing the host vehicle travel direction to the designated travel direction of the roadway on which the host vehicle is traveling;
comparing the second vehicle travel direction to the designated travel direction of the roadway;
providing an alert to the driver of the host vehicle indicating that the host vehicle is traveling a wrong way on the roadway when the host vehicle travel direction fails to match the designated travel direction of the roadway; and
providing another alert to the driver of the host vehicle indicating that the host vehicle is traveling a wrong way on the roadway when the host vehicle travel direction fails to match the second vehicle travel direction and the designated travel direction of the roadway.

11. The method of claim 10 wherein:
receiving a vehicle-to-x communication comprising data indicative of a characteristic of a second vehicle comprises receiving, at a first communication unit to be mounted in the host vehicle, a vehicle-to-x communication comprising data indicative of a characteristic of a second vehicle;
receiving a communication comprising map data for a geographic area comprises receiving, at a second communication unit to be mounted in the host vehicle, a communication comprising map data for a geographic area associated with the host vehicle and the second vehicle; and
providing an alert to the driver of the host vehicle comprises providing, by a controller to be mounted in the host vehicle, an alert to the driver of the host vehicle based on data indicative of a characteristic of the host vehicle, the data indicative of a characteristic of the second vehicle, and the map data for the geographic area associated with the host vehicle and the second vehicle.

12. The method of claim 10 wherein the data indicative of the characteristic of the host vehicle comprises data indicative of a latitude, longitude, elevation, speed, heading, acceleration, yaw rate, and/or path history of the host vehicle, and wherein the data indicative of the characteristic of the second vehicle comprises data indicative of a latitude, longitude, elevation, speed, heading, acceleration, yaw rate, and/or path history of the second vehicle.

13. The method of claim 10 wherein the map data comprises data indicative of a road geometry, a road intersection, a road elevation, a topography, a road boundary location and/or a shoreline location.

14. The method of claim 10 further comprising:
determining a trajectory of the host vehicle based on the data indicative of a characteristic of the host vehicle;
determining a location of a roadway dead end or a shoreline access point based on the map data;
comparing the trajectory of the host vehicle to the location of the roadway dead end or the shoreline access point; and
providing an alert to the driver of the host vehicle indicating that the host vehicle is proceeding to the roadway dead end or the shoreline access point when the trajectory of the host vehicle intersects the location of the roadway dead end or the shoreline access point.

15. The method of claim 10 further comprising:
determining a three-dimensional trajectory of the host vehicle based on the data indicative of a characteristic of the host vehicle and the map data;
determining a three-dimensional trajectory of the second vehicle based on the data indicative of a characteristic of the second vehicle and the map data;
comparing the three-dimensional trajectory of the host vehicle to the three-dimensional trajectory of the second vehicle; and
providing an alert to the driver of the host vehicle indicating an apparent collision between the host vehicle and the second when the three-dimensional trajectory of the host vehicle intersects the three-dimensional trajectory of the second vehicle.

16. The method of claim 10 further comprising:
determining a trajectory of the host vehicle based on the data indicative of a characteristic of the host vehicle;
determining a position of the second vehicle based on the data indicative of a characteristic of the second vehicle and the map data;
comparing the trajectory of the host vehicle to the position of the second vehicle; and
providing an alert to the driver of the host vehicle indicating an apparent collision of the host vehicle with the second vehicle when the trajectory of the host vehicle intersects the position of the second vehicle.

17. A non-transitory computer readable storage medium having stored computer executable instructions for providing an alert to a driver of a host vehicle comprising a communication unit configured to receive a vehicle-to-x communication comprising data indicative of a characteristic of a second vehicle, and a controller provided in communication with the communication unit, the computer executable instructions configured to cause the controller to:
provide an alert to the driver of the host vehicle based on data indicative of a characteristic of the host vehicle, the data indicative of a characteristic of the second vehicle, and map data for a geographic area associated with the host vehicle and the second vehicle;
determine a direction of travel of the host vehicle based on the data indicative of a characteristic of the host vehicle;
determine a direction of travel of the second vehicle based on the data indicative of a characteristic of the second vehicle;
determine a designated travel direction of a roadway on which the host vehicle is traveling based on the map data;
compare the host vehicle travel direction to the second vehicle travel direction;
compare the host vehicle travel direction to the designated travel direction of the roadway;
compare the second vehicle travel direction to the designated travel direction of the roadway;
provide an alert to the driver of the host vehicle indicating that the host vehicle is traveling a wrong way on the roadway when the host vehicle travel direction fails to match the designated travel direction of the roadway; and
provide another alert to the driver of the host vehicle indicating that the host vehicle is traveling a wrong way on the roadway when the host vehicle travel direction fails to match the second vehicle travel direction and the designated travel direction of the roadway.

18. A system for providing an alert to a driver of a host vehicle, the system comprising:
a communication unit to be mounted in the host vehicle and configured to receive a vehicle-to-x communication comprising data indicative of a characteristic of a second vehicle; and
a controller to be mounted in the host vehicle and provided in communication with the communication unit, wherein the controller is configured to provide an alert to the driver of the host vehicle based on data indicative of a characteristic of the host vehicle, the data indicative of a characteristic of the second vehicle, and map data for a geographic area associated with the host vehicle and the second vehicle:
wherein the controller is further configured to:
determine a trajectory of the host vehicle based on the data indicative of a characteristic of the host vehicle;
determine a location of a roadway dead end or a shoreline access point based on the map data;
compare the trajectory of the host vehicle to the location of the roadway dead end or the shoreline access point; and
provide an alert to the driver of the host vehicle indicating that the host vehicle is proceeding to the roadway dead end or the shoreline access point when the trajectory of the host vehicle intersects the location of the roadway dead end or the shoreline access point.

19. A method for providing an alert to a driver of a host vehicle, the method comprising:
receiving a vehicle-to-x communication comprising data indicative of a characteristic of a second vehicle;
receiving a communication comprising map data for a geographic area associated with the host vehicle and the second vehicle;
providing an alert to the driver of the host vehicle based on data indicative of a characteristic of the host vehicle, the data indicative of a characteristic of the second vehicle, and the map data for the geographic area associated with the host vehicle and the second vehicle;

determining a trajectory of the host vehicle based on the data indicative of a characteristic of the host vehicle;

determining a location of a roadway dead end or a shoreline access point based on the map data;

comparing the trajectory of the host vehicle to the location of the roadway dead end or the shoreline access point; and providing an alert to the driver of the host vehicle indicating that the host vehicle is proceeding to the roadway dead end or the shoreline access point when the trajectory of the host vehicle intersects the location of the roadway dead end or the shoreline access point.

20. A non-transitory computer readable storage medium having stored computer executable instructions for providing an alert to a driver of a host vehicle comprising a communication unit configured to receive a vehicle-to-x communication comprising data indicative of a characteristic of a second vehicle, and a controller provided in communication with the communication unit, the computer executable instructions configured to cause the controller to:

provide an alert to the driver of the host vehicle based on data indicative of a characteristic of the host vehicle, the data indicative of a characteristic of the second vehicle, and map data for a geographic area associated with the host vehicle and the second vehicle;

determine a trajectory of the host vehicle based on the data indicative of a characteristic of the host vehicle;

determine a location of a roadway dead end or a shoreline access point based on the map data;

compare the trajectory of the host vehicle to the location of the roadway dead end or the shoreline access point; and provide an alert to the driver of the host vehicle indicating that the host vehicle is proceeding to the roadway dead end or the shoreline access point when the trajectory of the host vehicle intersects the location of the roadway dead end or the shoreline access point.

* * * * *